May 4, 1926.
A. U. AVERA
1,583,641
POWER TRANSMISSION SYSTEM FOR BOATS AND THE LIKE
Filed May 24, 1923    3 Sheets-Sheet 1
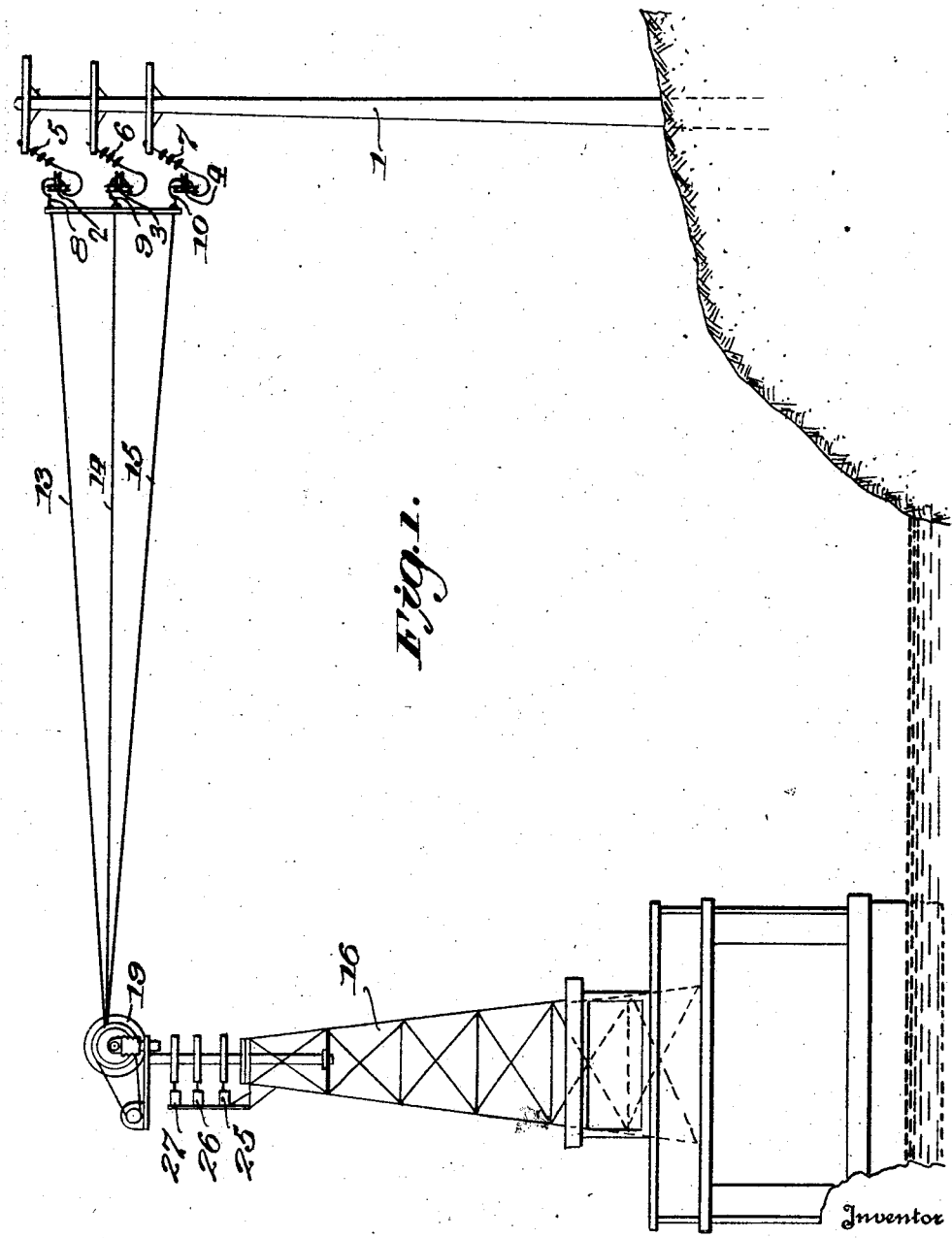

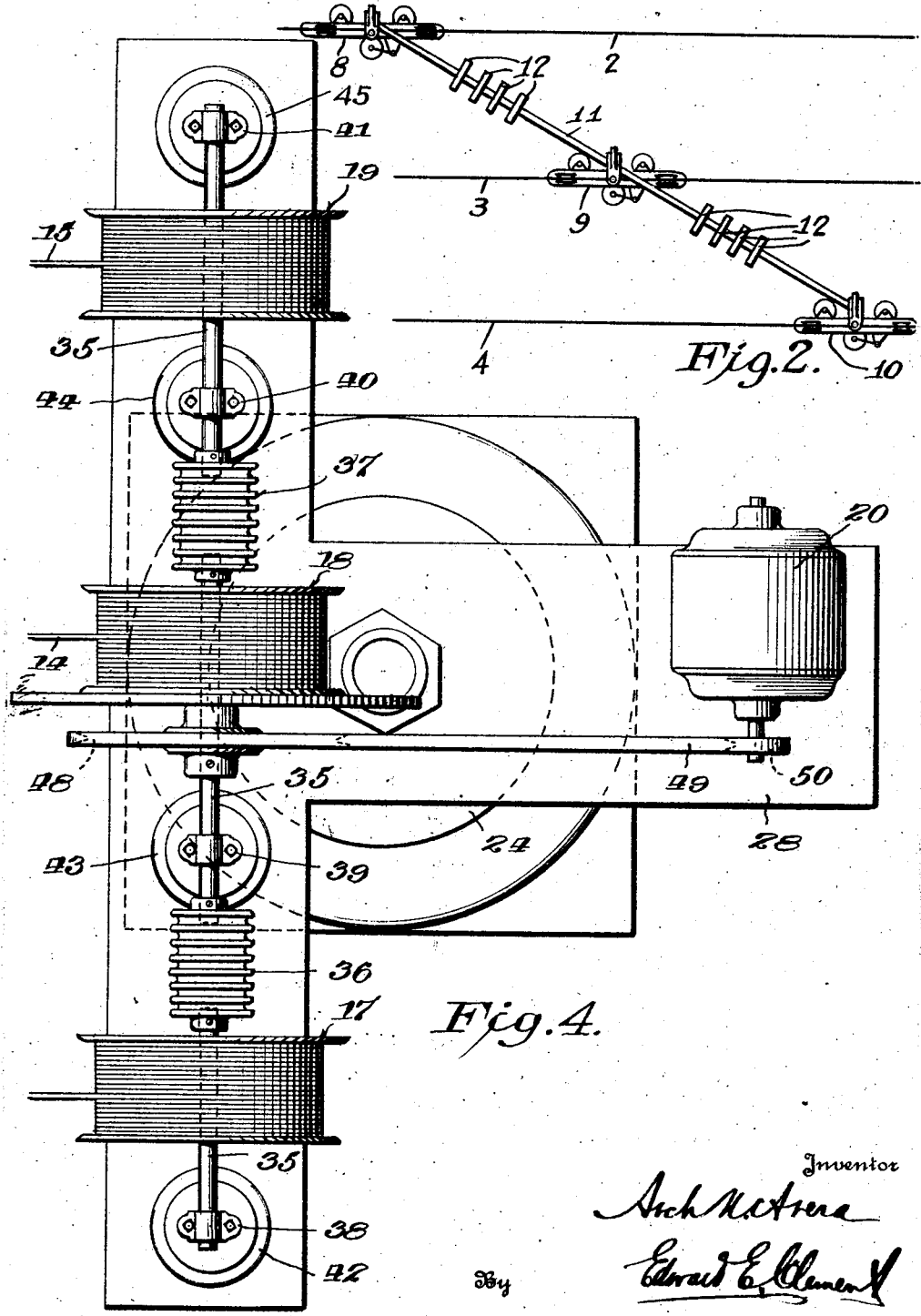

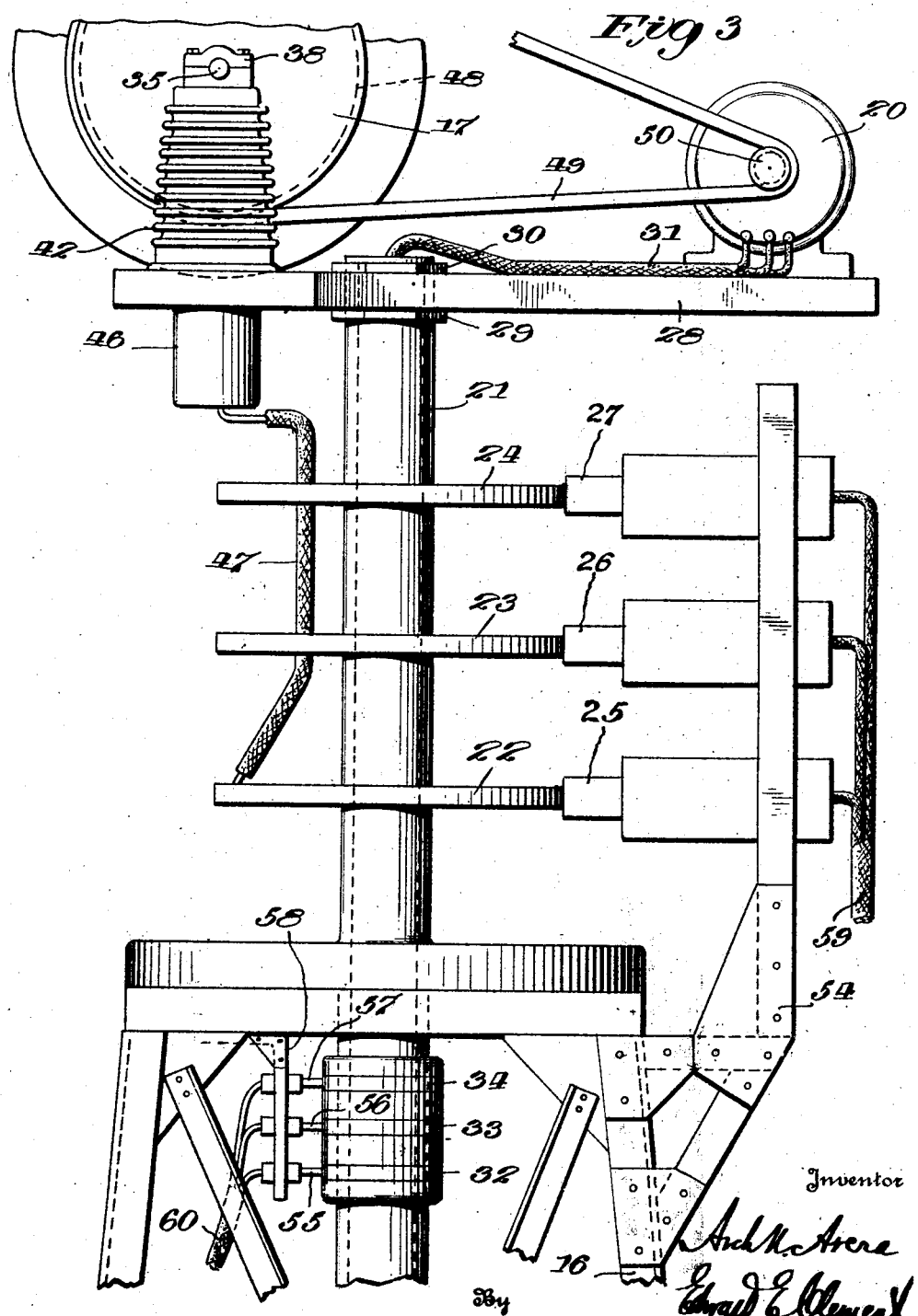

Patented May 4, 1926.

1,583,641

UNITED STATES PATENT OFFICE.

ARCH UPSHAW AVERA, OF FLORENCE, ALABAMA.

POWER-TRANSMISSION SYSTEM FOR BOATS AND THE LIKE.

Application filed May 24, 1923. Serial No. 641,103.

*To all whom it may concern:*

Be it known that ARCH U. AVERA, citizen of the United States, residing at the city of Florence, in the county of Lauderdale and State of Alabama, has invented certain new and useful Improvements in Power-Transmission Systems for Boats and the like, of which the following is a specification, reference being had therein to the accompanying drawing.

My invention relates to electrical power transmission and more particularly to the transmission of power to trackless vehicles such as canal boats, busses and the like.

The object of the invention is to provide means of the type and for the purpose above mentioned especially adapted for use on multiple wire trolley systems working on high potentials of the order of 2300 to 66000 volts and which will be sturdy, reliable in operation, and protected against electrical failures such as leakage, short-circuiting or insulation break-down.

Another object is to provide improved means for rendering the transmission means self compensating for variations in distance and level between the stationary trolley and the vehicle, and variations in the direction of strain.

Various other objects of the invention will be apparent from a perusal of the following specification and the drawings accompanying the same.

In the drawings:

Fig. 1 is an elevation partly in section showing a trolley system for boats with my invention applied.

Fig. 2 is a detail view of the trolley wheel support.

Fig. 3 is a front elevation, on a larger scale, showing the cable drum and slip-ring mounting.

Fig. 4 is a top plan view of Fig. 3.

Referring to the drawings in detail, and first to Figs. 1 and 2, 1 is representative of a series of trolley-wire supporting poles carrying a set of three supply wires 2, 3, and 4 supported by means of suspension insulators 5, 6, and 7 respectively, which form no part of my present invention and may therefore be considered as of any known form. These suspension insulators support the wires through suitable trolley-wire supports which also may be of any suitable type but are preferably of the type disclosed in my copending application filed May 24, 1923. Serial No. 641,102. The wires 2, 3, and 4 are engaged by a set of current collectors 8, 9 and 10, respectively preferably of the type disclosed in my copending application above referred to, which are mounted on an insulating, spacing rod 11 with suitable rain breaks 12 (Fig. 2). From the current collectors 8, 9, and 10, a set of three conducting cables 13, 14 and 15, leads to the lead-in tower 16, where the different cables connect with separate drums 17, 18 and 19, respectively, only one of which, 19, is in view in Fig. 1. These drums together with a torque motor 20, are mounted on a platform 28 mounted on top of a vertical shaft 21 journaled in the tower. Between the platform and the bottom of the tower, the shaft 21 carries a set of slip-rings, 22, 23 and 24 in electrical connection with the drums. The lead-in tower 16 is carried on a motor propelled boat, to the motors of which boat current is led from the slip-rings 22, 23 and 24 through suitable brushes shown conventionally at 25, 26 and 27 and a three conductor cable 59.

For a more detailed understanding of the arrangement of drums, supports and connections, reference is to be had to Figs. 3 and 4 which show, respectively, a front elevation and top plan view of the lead-in arrangement, on a larger scale. From these views, it will be noted that the vertical shaft 21 is hollow as indicated by the inner dotted lines, and extends through the platform which is secured thereto by the large nuts 29 and 30. A three conductor cable 31, for supplying three phase current to the torque-motor 20, leads from the motor down through the hollow shaft 21 to a set of three slip-rings 32, 33 and 34 with which the three different conductors respectively connect. These slip-rings, 32, 33 and 34, as well as the slip-rings 22, 23 and 24, are fixed on the hollow shaft so that the whole assemblage of slip-rings and platform 28 turn as one with the shaft.

The cable drums 17, 18 and 19 are fixed on a common driving shaft 35 mechanically connected but electrically insulated by high tension insulators 36 and 37. At the extreme ends and between the drums the shaft 35 is journaled in bearings 38, 39, 40 and 41 mounted on the platform 28 by means of high-tension insulators 42, 43, 44 and 45, formed with reduced portions or shanks such as that shown at 46 on the insulator 42 (see Fig. 3), which serve as bushings for suitable single conductor cables such as 47, one leading from each of the shaft bearings 38, 39 and 40 to the slip-rings 22, 23 and 24, respectively. A driving pulley 48 is fixed on the shaft 35 near the middle drum and connected by means of a belt 49 of insulating material with the pulley 50 of the motor 20.

A set of three brushes indicated at 25, 26 and 27, are mounted on the stationary portion of the tower by means of the bracket structure 54 in a manner to operatively engage with the power slip-rings 22, 23 and 24. A similar but smaller set of three brushes 55, 56 and 57 are mounted on a stationary part of the tower by means of a suitable bracket structure 58 in a manner to operatively engage with the motor slip-rings 32, 33 and 34. A three conductor cable 59 leads from the power brushes to a suitable transformer, not shown, in the boat and a similar three conductor cable 60 leads from the brushes 55, 56 and 57 to the output winding of the same or other suitable transformer for supplying the proper current to the torque motor 20.

The transformers, propelling motor and other power translating and consuming devices carried by the vehicle are not shown as their specific form will not affect the operation of the invention and it is to be understood that they may be of any known or other suitable type, the present invention consisting of the means for transmitting power to the vehicle carrying such devices of any type whatever.

In operation, power is supplied to the torque motor 20 in such manner as to maintain a substantially constant torque of sufficient amount to overcome the combined weight of the cables sufficiently to take up slack when the boat is at the maximum distance from the trolley wires 2, 3 and 4. As the torque of the motor is maintained constant the cable drums 17, 18 and 19, will be rotated to take up slack whenever the distance between the boat and the trolley system is decreased and will unreel against the torque of the motor, whenever the distance is increased. When, due to a change in the angle between the course of the boat and the trolley line, or variations in resistance of the movement of the current collectors along the trolley, the direction of pull of the cables is changed, the pivoted platform 28 will adjust itself to bring the group of cable drums between the axis of rotation of the platform and the ends of the cables, that is, adjust itself to arrange the axis of the cable drums substantially normal to the line of extension of the cables.

As the platform 28 rotates to effect this adjustment, the circuit connections between the platform and the stationary distributing cables 59 and 60 are maintained through the slip-ring connections in a manner well understood by those skilled in the art.

While I have herein illustrated and described a specific embodiment of my invention for the sake of disclosure, it is to be understood that I do not desire to limit myself to such specific embodiment, but contemplate all such variants and modifications thereof as fairly fall within the scope of the appended claims.

Having thus described my invention, what I claim and desire to secure in Letters Patent is:

1. In a system for transmitting power to vehicles, a vertical shaft rotatably mounted on the vehicle to which power is to be transmitted, a platform mounted on the shaft in fixed relation thereto, cable drums mounted on said platform, a common driving shaft for said drums mechanically and electrically connected thereto, insulators interposed in said shaft between the drums, bearings for the shaft on both sides of each drum, insulating supports for the bearings extending through said platform, certain of said insulators being provided with central openings extending from near the bearing to a point below the platform to act as a covering and bushing for a conductor cable, slip rings carried by the said vertical shaft below the platform, conductors leading from the slip-rings through the openings in said certain insulating supports to the driving-shaft bearings supported thereon, brushes for collecting current from said slip-rings, a driving motor for said driving shaft, a driving belt of insulating material mechanically connecting said motor with said driving shaft, a second set of slip rings on said vertical shaft, conductors passing through said shaft and electrically connecting said slip rings with said driving motor, and a set of brushes for supplying current to said motor slip rings.

2. In a system for transmitting power to vehicles, a vertical hollow shaft rotatably mounted on the vehicle to which power is to be transmitted, a platform fixed on the top of the shaft, a plurality of cable drums and torque motor therefor, a set of slip rings carried by the shaft and electrically connected to the drums and a second set of slip rings carried by the shaft and electrically connected with the motor by conductors passing through said hollow shaft.

3. In a system for transmitting power to vehicles; a multiple-conductor stationary trolley line, a plurality of conductor cables extending between the trolley line and the vehicle to which power is to be transmitted, current collectors attached to said cables and connected with said trolley line so as to travel along the same, drums for said cables carried by the vehicle on a common shaft, a torque motor for maintaining a substantially constant torque on said drums, said motor and drums being pivotally mounted as a whole on the vehicle, and slip ring connections between said motor and drums and the vehicle.

4. In a system for transmitting power to vehicles, a multiple-conductor trolley line, a swiveled platform, a plurality of cable drums fixed to a common shaft on said platform, flexible cables carried on said drums and electrically connected therewith, current collectors connecting the cables with the trolley line and adapted to travel thereon, a motor for operating the shaft, electrical distributing conductors carried by the vehicle in stationary relation thereto, and slip-ring connections between said distributing conductors and the said motor and drum.

5. In a system for transmitting power to vehicles, a multiple-conductor trolley line, a tower carried by the vehicle to which power is to be transmitted, a platform pivotally mounted upon the tower to rotate about a vertical axis, a plurality of cable drums fixed to a common shaft mounted upon the platform to one side of the said vertical axis, a driving motor for the said shaft mounted upon the platform on the opposite side of said vertical axis, conducting cables carried on said drums and extending therefrom to the trolley line, current collectors connecting the cables with the trolley line and adapted to travel along the same, electrical distributing conductors carried by the vehicle, and slip-ring connections between said conductors, and said motor and cable.

In testimony whereof I hereunto affix my signature.

ARCH UPSHAW AVERA.